(12) United States Patent
St. Martin et al.

(10) Patent No.: US 8,885,219 B2
(45) Date of Patent: Nov. 11, 2014

(54) PRINTING SYSTEM COLOR VALIDATION SWATCH METHODS AND SYSTEMS

(75) Inventors: Kevin Joseph St. Martin, Rochester, NY (US); Barry K. Ayash, Webster, NY (US); Adam Andrzej Gierczak, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 282 days.

(21) Appl. No.: 13/089,700

(22) Filed: Apr. 19, 2011

(65) Prior Publication Data

US 2012/0268755 A1 Oct. 25, 2012

(51) Int. Cl.
*H04N 1/405* (2006.01)
*H04N 1/60* (2006.01)

(52) U.S. Cl.
CPC ................................ *H04N 1/6033* (2013.01)
USPC ............................ 358/2.1; 358/406; 358/527

(58) Field of Classification Search
USPC ........... 358/1.9, 2.1, 468, 400, 500, 406, 504, 358/527
See application file for complete search history.

(56) References Cited

U.S. PATENT DOCUMENTS

| | | | |
|---|---|---|---|
| 5,749,020 A | 5/1998 | Mestha et al. | |
| 6,038,374 A * | 3/2000 | Jacob et al. | 358/1.9 |
| 6,351,263 B1 * | 2/2002 | Naoi | 345/589 |
| 6,441,923 B1 * | 8/2002 | Balasubramanian et al. | 358/3.23 |
| 6,840,597 B1 * | 1/2005 | Wilson et al. | 347/19 |
| 7,149,444 B2 * | 12/2006 | Tanaka et al. | 399/49 |
| 7,800,779 B2 | 9/2010 | Fan et al. | |
| 2008/0050133 A1 | 2/2008 | Adiletta | |
| 2008/0075492 A1 | 3/2008 | Mestha et al. | |
| 2008/0137150 A1 | 6/2008 | Wang et al. | |
| 2008/0247770 A1 | 10/2008 | Morales et al. | |
| 2009/0033970 A1 | 2/2009 | Bray et al. | |

* cited by examiner

*Primary Examiner* — Thomas D Lee
*Assistant Examiner* — Stephen M Brinich
(74) *Attorney, Agent, or Firm* — Fay Sharpe LLP

(57) ABSTRACT

Disclosed are methods, apparatus and systems of characterizing a color rendering performance of a printing system. According to one exemplary method, a user operated UI provides instructions to a printing system to automatically execute a color validation swatch process during the execution of a print job. The user provided instructions provide the parameters necessary to configure the execution of the color validation process.

21 Claims, 5 Drawing Sheets

PRINTING SYSTEM COLOR VALIDATION SWATCH METHODS AND SYSTEMS

CROSS REFERENCE TO RELATED PATENTS AND APPLICATIONS

U.S. Patent Application Publication No 2009/0033970, published Feb. 5, 2009, entitled "COLOR JOB REPRINT SET-UP FOR A PRINTING SYSTEM," by Bray et al. is incorporated herein by reference in its entirety.

BACKGROUND

This disclosure relates to color printing systems. Generally, it finds particular application in conjunction with document processing and image processing systems and will be described with particular reference thereto. However, it is to be appreciated that some embodiments may be amenable to other applications.

Maintaining consistent and uniform tones is a desired goal in most, if not all, image rendering processes and devices. In other words, it is desirable for an image to appear the same no matter which rendering system renders the image and no matter how many times an image is rendered on a particular system. The image should exhibit, for example, the same lightness or hue each time it is rendered on a given system and no matter on which system it is rendered. For this reason, rendering engines, such as print engines in a printing system, are put through a characterization process in order to determine appropriate compensation values for a particular engine. While this characterization process is useful in determining an initial set of compensation levels for a particular engine, it is often desirable to perform later calibrations to account for variations in the required compensation over time. For example, in printing systems, it is common to use tone reproduction curves (TRCs), which are determined during the initial characterization process. These TRCs can then be updated, calibrated or recalibrated overtime by periodically printing test patches at various calibration levels and sensing the printed test patches to determine appropriate compensations for the initial TRCs so that the new TRCs can give appropriate compensation for the current state of a drifted print engine.

Where image data is available in a contone format, TRCs can be used to adjust pixel values to compensate for the characteristics of a particular rendering engine. During the calibration process, a calibration image is rendered by the rendering engine, and a sensor is used to measure or analyze an aspect of the rendered image. For example, the image generally includes portions that are meant to be rendered to have the same lightness or shade of gray. Therefore, the lightness or shade of gray of the rendered image is measured. The measurements may then be used to generate an engine response curve (ERC). The engine response curve may describe a response, such as an average response, over the entire area of the diagnostic or calibration image.

Engine response curves and tone reproduction curves are referred to as curves because the information they contain or are associated with may sometimes be displayed or discussed as a plot of data points. However, information related to both ERCs and compensating TRCs may be stored or manipulated as tables of data, sets of coefficients and/or constants associated with equations, or by other means, as may be convenient.

As indicated above, compensating TRCs are useful for compensating pixel-described input to produce desired colors or shades of gray with a relatively fine resolution. For example, compensating TRCs are useful where image pixels describe an input or desired color with one or more values in a relatively broad range of, for example, 0-255. Such pixels are said to describe an input or desired color or desired shade of gray with contone values. In such systems, one may select an appropriate compensating TRC for a pixel location in rendered image space based on a contone value of the input pixel and look-up and/or calculate a compensated contone value based on the selected compensating TRC.

One common characteristic associated with some characterization and calibration procedures is their lack of ability to provide a non-expert user of a printing system a visual indicator of the color rendering performance of the printing system for a particular job and/or time interval. Consequently, users of printing systems who have color critical applications sometimes insert a designated color test pattern in the printer workflow to allow the user to store a hard copy/sample of the color output for future viewing and validation.

What is needed is an automatic and intelligent manner of producing color test patterns for future viewing by the user to validate or invalidate the color rendering performance of the printing system.

INCORPORATION BY REFERENCE

U.S. Patent Application Publication No. 2009/0033970, published Feb. 5, 2009, entitled "COLOR JOB REPRINT SET-UP FOR A PRINTING SYSTEM," by Bray et al.;

U.S. Pat. No. 5,749,020, issued May 5, 1998, entitled "COORDINITIZATION OF TONE REPRODUCTION CURVE IN TERMS OF BASIS FUNCTIONS," to L. K. Mestha et al.; and, U.S. Pat. No. 7,800,779, issued Sep. 15, 2009, entitled "SYSTEM AND METHOD FOR IMAGE BASED CONTROL USING INLINE SENSORS," by Zhigang Fan et al., are all incorporated herein by reference in their entirety

BRIEF DESCRIPTION

In one embodiment of this disclosure, described is a method of characterizing a color rendering performance of a printing apparatus, the printing apparatus including a UI (User Interface), a controller and a printing device, the method comprising a) receiving one or more user selectable instructions from the UI to execute a color validation swatch process, wherein the user selectable instructions provide parameters to configure the execution of the color validation swatch process; b) executing the color validation swatch process wherein the execution of the color validation swatch process includes one or more color validation swatches rendered during the execution of the color validation swatch process; c) sequentially compiling the rendered color validation swatches; and d) inspecting the compiled rendered color validation swatches to characterize the color rendering performance of the printing apparatus.

In another embodiment of this disclosure, described is a printing apparatus comprising a UI (User Interface); a printing device; and a controller operatively connected to the UI and the printing device, the controller configured to store computer readable instructions, that when executed by the controller, cause the controller to perform a method of characterizing the color rendering performance of the printing apparatus, the method comprising a) receiving one or more user selectable instructions from the UI to execute a color validation swatch process, wherein the user selectable instructions provide parameters to configure the execution of the color validation swatch process; b) executing the color validation swatch process wherein the execution of the color validation swatch process includes one or more color validation swatches rendered during the execution of the color validation swatch process; c) sequentially compiling the rendered color validation swatches; and d) inspecting the compiled rendered color validation swatches to characterize the color rendering performance of the printing apparatus.

In yet another embodiment of this disclosure, described is a computer program product storing computer readable instructions, that when executed by a controller, performs a method of characterizing a color rendering performance of a printing apparatus, the printing apparatus including a UI (User Interface), the controller and a printing device, the method comprising a) receiving one or more user selectable instructions from the UI to execute a color validation swatch process, wherein the user selectable instructions provide parameters to configure the execution of the color validation swatch process; b) executing the color validation swatch process wherein the execution of the color validation swatch process includes one or more color validation swatches rendered during the execution of the color validation swatch process; c) sequentially compiling the rendered color validation swatches; and d) inspecting the compiled rendered color validation swatches to characterize the color rendering performance of the printing apparatus.

DETAILED DESCRIPTION

Figure 1:
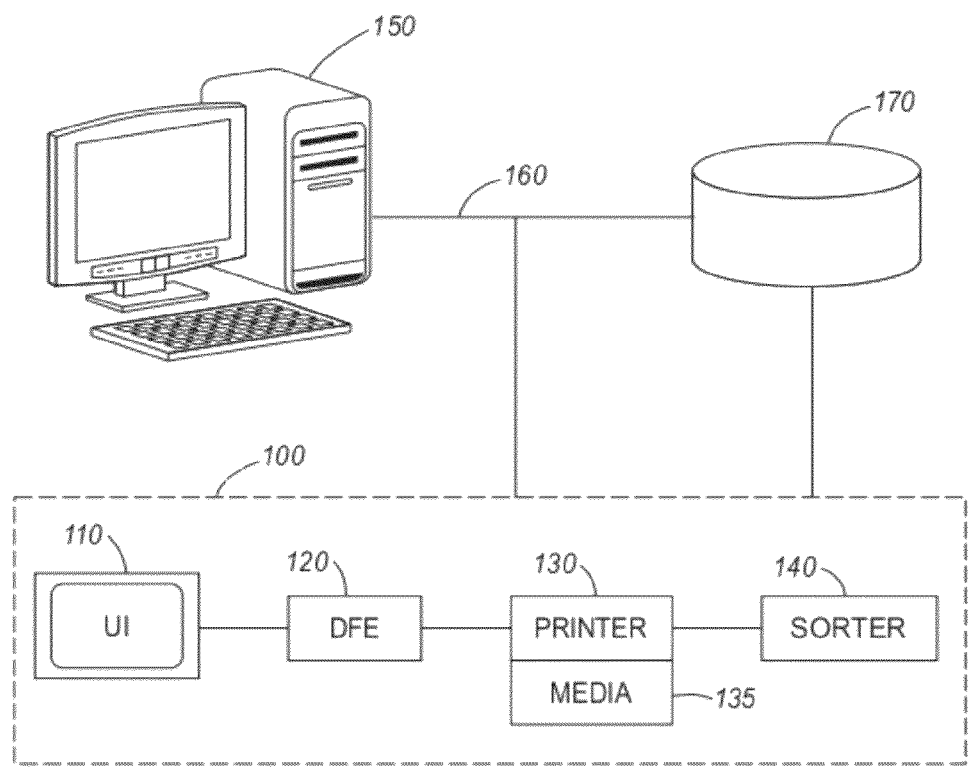
FIG. 1 illustrates a printing apparatus according to one exemplary embodiment of this disclosure.

This disclosure provides a configurable Color Validation Swatch (CVS) method and system to print a CVS during a predetermined point in each print job. The Color Validation Swatch contains a color test pattern and also other meta data that associates the swatch with the job. In addition, pertinent print parameter information can also be provided with the color test pattern. The swatch can be recalled later to use for analysis in determining the rendering performance of the associated printing device, for example a xerographic printer or an ink jet printer. Color swatch generation, according to this disclosure, is an automatic part of the color printing workflow that doesn't require any user interaction other than initial configuration activity. In addition to a completely automatic option that uses defaults to generate a color swatch, a manual control option may also be made available to the user. Overall, the disclosed embodiments simplify and improve the color printing and validation workflow for a user of the printing device.

As briefly discussed in the background, there is always some known color variation in digital printing, with no easy visual way for a customer to have a color swatch pattern printed at the completion of a production job. Users of existing printing systems who have color critical applications sometimes insert their own designed color test patterns into their workflow to allow them to store a sample of the color output for future viewing and validation.

According to one aspect of this disclosure, provided is the creation of a color test pattern on a Digital Front End (DFE) that can be toggled like a banner, job ticket, or error page; which is referred to as a Color Validation Swatch (CVS) for purposes of this disclosure. With the CVS setting enabled and associated with a particular printing job or queue level, a Color Validation Swatch is printed at the end or at some pre-determined point of each job. Optionally, the Color Validation Swatch may include some information about the job, for example, but not limited to job name, date and time, length of run, etc. The Color Validation Swatch process may also have two modes, generic and customizable. Generic is a default color swatch process created by the DFE. Customizable mode can enable a set amount of custom pantone colors to be enabled on the swatch. This Color Validation Swatch can be stored and then recalled at a later date for purposes of determining the color rendering performance of the printing device. For example, determining if the color image quality has drifted/shifted.

Some portions of the detailed description that follows are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description below. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

With reference now to FIG. 1, an image rendering system (or printing system) 100 suitable for implementing aspects of the exemplary embodiment is illustrated. The printing system 100 includes a user interface 110, a digital front end (DFE) controller 120, and a print engine 130. The printing system 100 is generally assumed to be a printer, however, it is within the scope of the disclosure for the printing system 100 to be a copier. The print engine 130 has access to media 135 of various sizes and workflow for a print job. A "print job" or "document" is normally a set of related sheets, usually one or more collated copy sets copied from a set of original print job sheets or electronic document page images, from a particular user, or otherwise related. For submission of a regular print job (or customer job), digital data is generally sent to the printing system 100. A sorter 140 operates after a job is printed by the print engine 130 to manage arrangement of the hard copy output, including cutting functions. A user can access and operate the printing system 100 using the user interface 110 or via a workstation 150. The workstation 150 communicates with the printing system 100 via a communications network 160. A user profile, work product for printing, media library, and print job parameters can be stored in a database or memory 170 accessible by the workstation 150 or the printing system 100 via the network 160, or can be directly accessed via the printing system 100. One or more color sensors (not shown), such as an RGB scanner, a spectral sensor with a photo detector or other such sensing device known in the art, may be embedded in the printer paper path.

Figure 2:
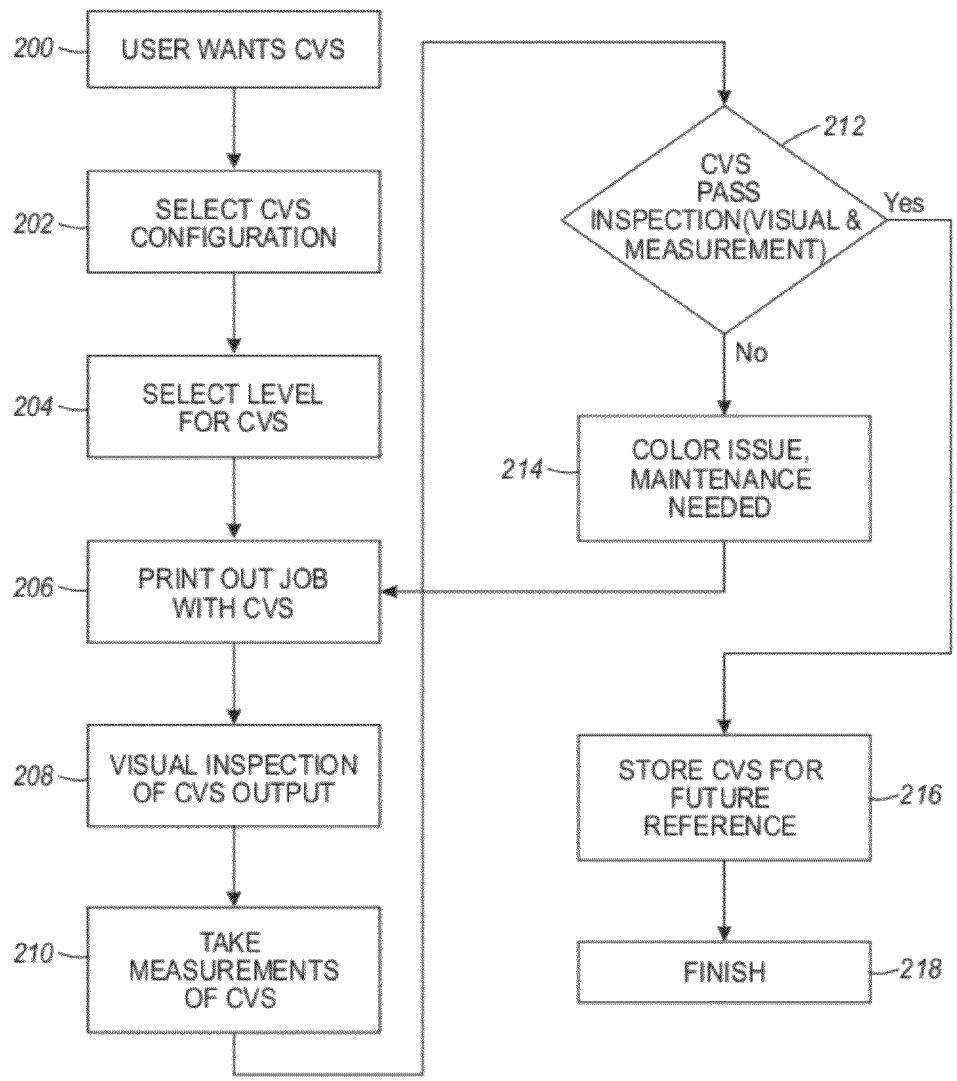
FIG. 2 is a flow chart of a color validation swatch process according to an exemplary embodiment of this disclosure.

With reference to FIG. 2, illustrated is a flow chart of an exemplary color validation swatch process according to this disclosure. It is to be understood that the process may be implemented in the DFE 120 and/or the Printer 140 of FIG. 1.

Initially, a user determines that she/he desires 200 a CVS to be associated with one or more of a print job, printing environment, time duration, etc.

Figure 3:
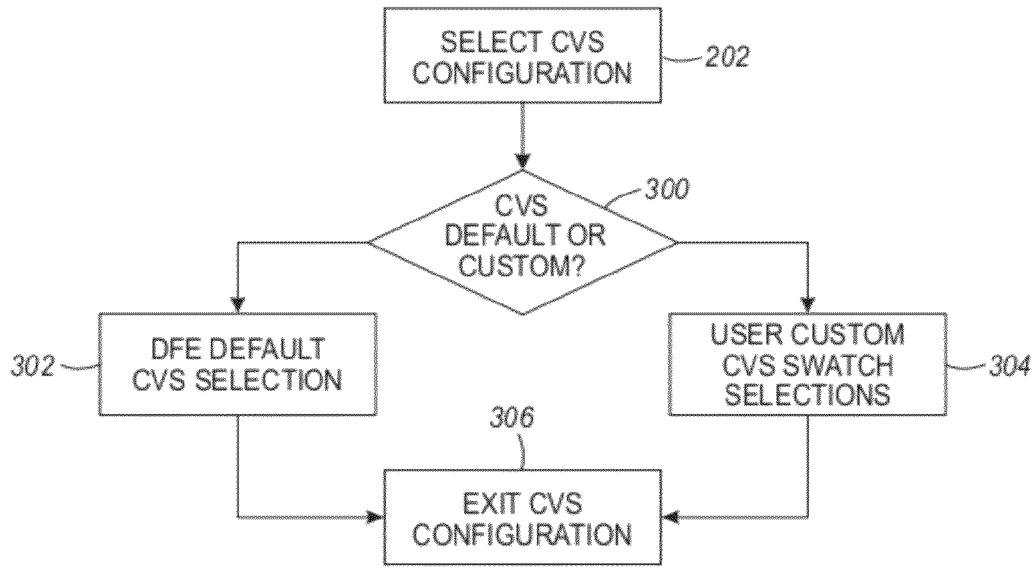
FIG. 3 is a flow chart of a user interface for configuring a Color Validation Swatch process according to an exemplary embodiment of this disclosure.

Next, the user, via a UI (User Interface) selects 202 a CVS configuration. For example, as shown in FIG. 3, the user may select 300 a DFE Default CVS Selection 302 or a Custom CVS Swatch Selection 304, before proceeding 306 to the next process step.

Figure 4:
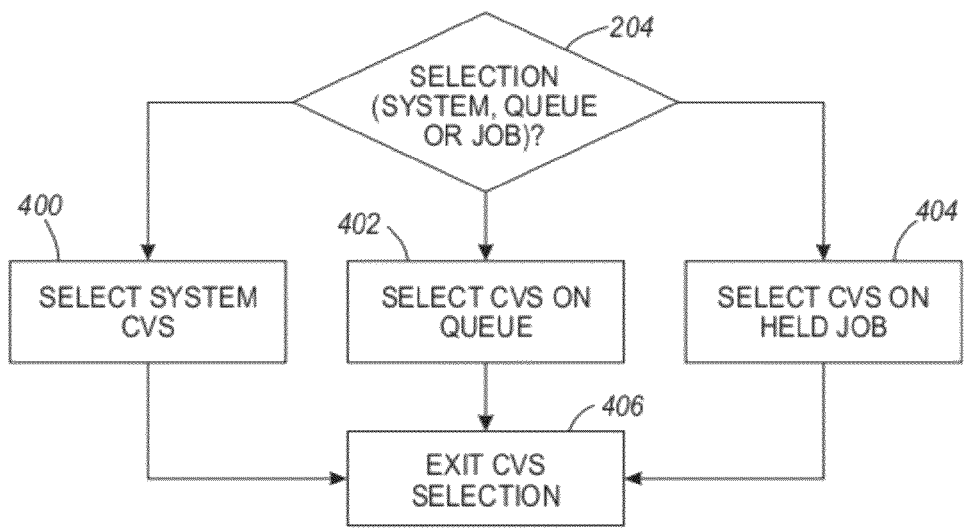
FIG. 4 is a flow chart of a user interface for selecting a level of operation for the Color Validation Swatch process according to an exemplary embodiment of this disclosure.

Next, the user, via the UI, selects 204 a level for the CVS configuration. For example, as shown in FIG. 4, the user may select a System CVS 400, a Job Queue CVS 402 or a Held Job 404 CVS, before proceeding 406 to the next step.

Next, the DFE executes the CVS process and prints on one or more color validation swatches which are associated with the configuration and level parameters of steps 202 and 204.

Next, the user visually inspects the CVS outputs to determine whether or not the color rendering performance of the printing system is acceptable. In other words, is the CVS consistent with previously printed CVS. Notably, this may be accomplished by simply fanning through a series of CVS which were printed sequentially in time to visually inspect the rendering consistency of the printing system.

Alternatively, spectral measurements of the CVS output can be taken, as indicated in step 210, which can provide a basis for determining if the rendering performance of the printing system is acceptable to the user.

In the event the CVS output is determined to be acceptable at step 212, the process/user stores the CVS for future reference, and the CVS process ends 218.

In the event the CVS output is determined to be unacceptable at step 212, the process executes instructions 214 to prompt maintenance of the printing system to achieve the color rendering performance desired.

Subsequently, step 206 is repeated to execute a print job including a CVS for visual/spectral measurement as previously described.

Figure 5:
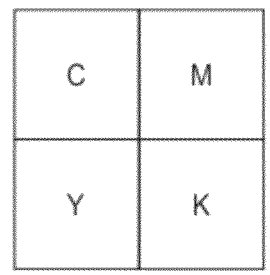
FIGS. 5, 6 and 7 are exemplary embodiments of swatches according to this disclosure.
Figure 6:
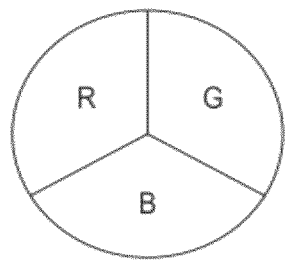
Figure 7:
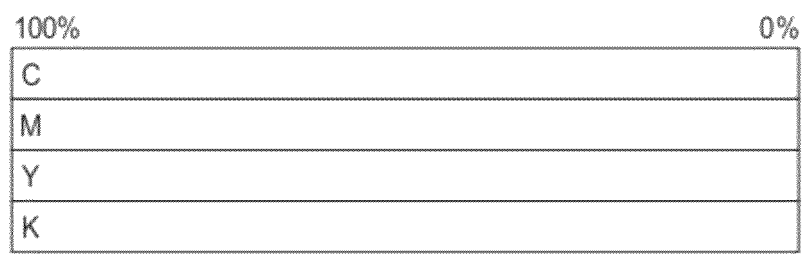

With reference to FIGS. 5-7, illustrated are exemplary embodiments of swatches according to this disclosure. It is to be understood that the swatches provided are only non-limiting examples and other swatch designs are within the scope of this disclosure.

FIG. 5 illustrates a swatch of a rectangular/square design including four areas which are individually associated with cyan (C), magenta (M), yellow (Y) and black (K). The toner/ink area coverage (i.e. 0-100%) is a parameter provided by the user via the UI previously discussed. For example, a user can configure the CVS system to print a full sheet rectangular swatch, as shown in FIG. 5, including C=50%; M=50%; Y=50% and K=50% toner area coverage.

FIG. 6 illustrates a pie-shaped swatch according to another exemplary embodiment. Here, the swatch includes three equivalent sections corresponding to Red (R), Green (G) and Blue (B). As in the case of the rectangular swatch, the toner/ink area coverage is provided by the user via the UI.

FIG. 7 illustrates a banner style swatch according to another exemplary embodiment. Here, the swatch includes a spectrum of toner/ink coverages spanning the width of a sheet.

Figure 8:
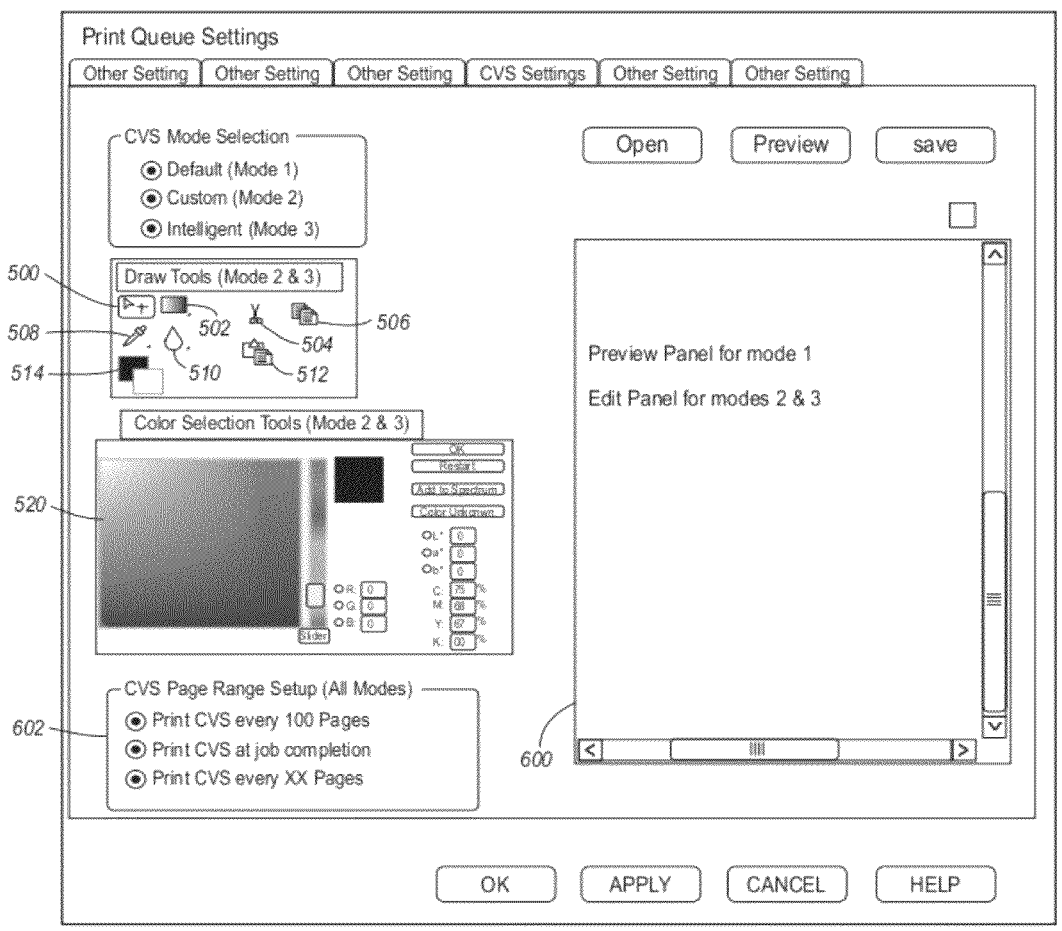
FIG. 8 is an exemplary embodiment of a CVS settings window according to this disclosure.

With reference to FIG. 8, illustrated is an exemplary embodiment of a CVS setting window according to this disclosure. The CVS setting window is accessible by a user via the UI previously described. As shown, the window includes a CVS Mode Selection criteria including a Default Mode 1, Custom Mode 2 and Intelligent Mode 3. Default Mode 1 accesses a previously DFE/Printer stored CVS parameters providing a predefined swatch using predefined colors. As shown, Custom and Intelligent Mode include tools to draw, i.e., design, a swatch including a user defined shape. Furthermore, the Color Selection Tools provide the user with the ability to configure the colors rendered using the user designed swatch.

In the CVS Custom Mode, the user provides all parameters associated with the rendered swatch colors, including color, tone/ink coverage. Drawing tools available, according to one exemplary embodiment, include a pointer 500, a gradient box (0-100%) 502, a cut and paste tool 504, copy 506, color indication 508, i.e. CMYK recipe, paint function 510, paste 512 and a dynamic representation of the color selector 514 which can be dragged to CVS preview window 520 for viewing. As shown in FIG. 8, associated with the CVS preview window are user modifiable parameters of a previewed swatch, including configurable settings for RGB color space (0-255), L*a*b* color space (−128-+128) and CMYK color space (0-100%). A Preview Panel 600 provides a previewing of a default swatch and also provides an Edit Panel for a swatch generated in Custom Mode 2 or Intelligent Mode 3.

In addition to providing color settings associated with a swatch to be rendered, the CVS setting window provides configurable settings associated with the printing frequency of the swatch 602. For example, but not limited to, printing CVS every 100 pages, printing CVS at job completion and/or printing CVS every xx pages.

Regarding Intelligent Mode 3 operation, this mode of operating the CVS includes the user accessing and executing, either manually or automatically, algorithms to intelligently select colors to be utilized in the CVS process.

According to one exemplary embodiment, one or more PreScan processes are performed on each print job before printing. The PreScan processes are performed on each print job before printing, the PreScan process requiring a Preflight or RIP of the print job to locate one or more elements associated with the print job and their frequency of occurrence, each PreScan detecting repeating patterns that drive the format of the CVS in intelligent mode.

For example, but not limited to,

Spot Color PreScan—Preflight feature which gets all spot colors in the job and adds them to swatches Custom Color PreScan—Preflight feature which gets all Custom Colors and adds them to swatches Pantone Color PreScan—Preflight feature that gets all pantone color calls and adds them to swatches Halftone PreScan—Preflight prints out the swatches in their designated halftone value Colored Text PreScan—Preflight feature that grabs any text with any CMYK, RGB, or Pantone that is not Black Logo PreScan—Preflight feature that would grab any graphics and BitMaps and any corresponding text and add them to swatches Picture PreScan—Preflight feature that grab any JPEG that would contain the picture and add them to swatches All of the above PreScan options, according to one exemplary embodiment, have check boxes on the CVS setting interface so a user can check one or more options. At the completion of the PreScans, a Frequency Table is generated with the results of the PreScans for all the categories above, which drives the formulation of the Intelligent CVS based on the frequency of each PreScan element.

All of the PreScan options can be put in a frequency table, so that the swatches only print out the "more used" color objects. In addition, there may be a few different choices in the pulldown, such as more than once, more than 5 times, more than 10 times. In addition, based on the above PreScans and Frequency Table a CVS is built around the elements that occur the most and apply it to a swatch.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of characterizing a color rendering performance of a printing apparatus associated with printing of a particular regular print job, the printing apparatus including a UI (User Interface), a controller and a printing device, the method comprising:
    a) the controller receiving one or more user selectable instructions from the UI to automatically execute a color validation swatch process to modify a workflow associated with the printing apparatus to include one or more color validation swatches in addition to a particular regular print job not including the color validation swatch, wherein each color validation swatch is printed on a separate media sheet along with printed meta data associating the printed color validation swatch with the particular regular print job, and the user selectable instructions provide parameters to configure the execution of the color validation swatch process;
    b) executing the color validation swatch process wherein the execution of the color validation swatch process includes the one or more color validation swatches and associated meta data printed during the execution of the color validation swatch process, the associated meta data including data associating the one or more color validation swatches with the particular regular print job;
    c) sequentially compiling the printed color validation swatches and associated meta data; and
    d) performing one or more of visually inspecting the compiled printed color validation swatches and associated meta data to characterize the color rendering performance of the printing apparatus associated with the printing of the regular print job, storing the compiled printed color validation swatches and associated meta data, and measuring the colorimetric properties associated with the color validation swatches.

2. The method according to claim 1, wherein the user selectable instructions provide parameters to configure the color validation swatch process to be executed during the execution of one or more of an associated printing job, an associated printer queue, and a predetermined event associated with the printing device.

3. The method according to claim 1, step a) comprising:
    the user selectable instructions providing parameters to configure the color validation swatch process to be executed during the execution of one or more user selected printing jobs;
    step b) comprising:
    executing the color validation swatch process during the execution of the one or more user selected print jobs, wherein the execution of the one or more user selected printing jobs provides a completed printed job including one or more color validation swatches rendered during the execution of the color validation swatch process.

4. The method according to claim 1,
    step a) comprising:
    the user selectable instructions providing parameters to configure the color validation swatch process to be executed during the execution of a user selected printing job queue;
    step b) comprising:
    executing the color validation swatch process during the execution of the user selected printing job queue.

5. The method according to claim 1,
    step a) comprising:
    the user selectable instructions providing parameters to configure the color validation swatch process to be executed after the completion of a predetermined event associated with the printing device.

6. The method according to claim 1, wherein the color validation swatch includes one or more of a printing job name associated with the color validation swatch, a time associated with the execution of the color validation swatch process, a data associated with the execution of the color validation swatch process, and a length of run associated with the execution of the color validation swatch process.

7. The method according to claim 1, wherein the one or more user selectable instructions includes a default generic mode and a customizable mode.

8. A printing apparatus comprising:
a UI (User Interface);
a printing device; and
a controller operatively connected to the UI and the printing device, the controller configured to store computer readable instructions, that when executed by the controller, cause the controller to perform a method of characterizing the color rendering performance of the printing apparatus associated with printing of a particular regular print job, the method comprising:
  a) the controller receiving one or more user selectable instructions from the UI to automatically execute a color validation swatch process to modify a workflow associated with the printing apparatus to include one or more color validation swatches in addition to a particular regular print job not including the color validation swatch, wherein each color validation swatch is printed on a separate media sheet along with printed meta data associating the printed color validation swatch with the particular regular print job, and the user selectable instructions provide parameters to configure the execution of the color validation swatch process;
  b) executing the color validation swatch process wherein the execution of the color validation swatch process includes the one or more color validation swatches and associated meta data printed during the execution of the color validation swatch process, the associated meta data including data associating the one or more color validation swatches with the particular regular print job;
  c) sequentially compiling the printed color validation swatches and associated meta data; and
  d) performing one or more of visually inspecting the compiled printed color validation swatches and associated meta data to characterize the color rendering performance of the printing apparatus associated with the printing of the regular print job, storing the compiled printed color validation swatches and associated meta data, and measuring the colorimetric properties associated with the color validation swatches.

9. The printing apparatus according to claim 8, wherein the user selectable instructions provide parameters to configure the color validation swatch process to be executed during the execution of one or more of an associated printing job, an associated printer queue, and a predetermined event associated with the printing device.

10. The printing apparatus according to claim 8, step a) comprising:
the user selectable instructions providing parameters to configure the color validation swatch process to be executed during the execution of one or more user selected printing jobs;
step b) comprising:
executing the color validation swatch process during the execution of the one or more user selected print jobs, wherein the execution of the one or more user selected printing jobs provides a completed printed job including one or more color validation swatches rendered during the execution of the color validation swatch process.

11. The printing apparatus according to claim 8,
step a) comprising:
the user selectable instructions providing parameters to configure the color validation swatch process to be executed during the execution of a user selected printing job queue;
step b) comprising:
executing the color validation swatch process during the execution of the user selected printing job queue.

12. The printing apparatus according to claim 8,
step a) comprising:
the user selectable instructions providing parameters to configure the color validation swatch process to be executed after the completion of a predetermined event associated with the printing device.

13. The printing apparatus according to claim 8, wherein the color validation swatch includes one or more of a printing job name associated with the color validation swatch, a time associated with the execution of the color validation swatch process, a data associated with the execution of the color validation swatch process, and a length of run associated with the execution of the color validation swatch process.

14. The printing apparatus according to claim 9, wherein the one or more user selectable instructions includes a default generic mode and a customizable mode.

15. A computer program product storing computer readable instructions on a non-transitory computer readable medium, that when executed by a controller, performs a method of characterizing a color rendering performance of a printing apparatus, the printing apparatus including a UI (User Interface), the controller and a printing device, the method comprising:
  a) the controller receiving one or more user selectable instructions from the UI to automatically execute a color validation swatch process to modify a workflow associated with the printing apparatus to include one or more color validation swatches in addition to a particular regular print job not including the color validation swatch, wherein each color validation swatch is printed on a separate media sheet along with printed meta data associating the printed color validation swatch with the particular regular print job, and the user selectable instructions provide parameters to configure the execution of the color validation swatch process;
  b) executing the color validation swatch process wherein the execution of the color validation swatch process includes the one or more color validation swatches and associated meta data printed during the execution of the color validation swatch process, the associated meta data including data associating the one or more color validation swatches with the particular regular print job;
  c) sequentially compiling the printed color validation swatches and associated meta data; and
  d) performing one or more of visually inspecting the compiled printed color validation swatches and associated meta data to characterize the color rendering performance of the printing apparatus associated with the printing of the regular print job, storing the compiled printed color validation swatches and associated meta data, and measuring the colorimetric properties associated with the color validation swatches.

16. The computer program product according to claim 15, wherein the user selectable instructions provide parameters to configure the color validation swatch process to be executed during the execution of one or more of an associated printing job, an associated printer queue, and a predetermined event associated with the printing device.

17. The computer program product according to claim 15, step a) comprising:

the user selectable instructions providing parameters to configure the color validation swatch process to be executed during the execution of one or more user selected printing jobs;

step b) comprising:

executing the color validation swatch process during the execution of the one or more user selected print jobs, wherein the execution of the one or more user selected printing jobs provides a completed printed job including one or more color validation swatches rendered during the execution of the color validation swatch process.

18. The computer program product according to claim 15, step a) comprising:

the user selectable instructions providing parameters to configure the color validation swatch process to be executed during the execution of a user selected printing job queue;

step b) comprising:

executing the color validation swatch process during the execution of the user selected printing job queue.

19. The computer program product according to claim 15, step a) comprising:

the user selectable instructions providing parameters to configure the color validation swatch process to be executed after the completion of a predetermined event associated with the printing device.

20. The computer program product according to claim 15, wherein the color validation swatch includes one or more of a printing job name associated with the color validation swatch, a time associated with the execution of the color validation swatch process, a data associated with the execution of the color validation swatch process, and a length of run associated with the execution of the color validation swatch process.

21. The computer program product according to claim 15, wherein the one or more user selectable instructions includes a default generic mode and a customizable mode.

\* \* \* \* \*